United States Patent
Luan et al.

[11] Patent Number: 5,911,149
[45] Date of Patent: Jun. 8, 1999

[54] APPARATUS AND METHOD FOR IMPLEMENTING A PROGRAMMABLE SHARED MEMORY WITH DUAL BUS ARCHITECTURE

[75] Inventors: Chung-Chen Luan, Saratoga; Siu-Ming Chong, Fremont; James H. Wang, San Jose; John Wong, Oakland; Gong-Jong Yeh, San Jose, all of Calif.

[73] Assignee: NEC Electronics Inc., Santa Clara, Calif.

[21] Appl. No.: 08/742,339

[22] Filed: Nov. 1, 1996

[51] Int. Cl.⁶ .............................. G06F 12/00; G06F 13/20; G06F 13/36
[52] U.S. Cl. ...................... 711/147; 395/200.45; 395/280; 395/308; 711/130; 711/131; 711/148; 711/153; 711/154
[58] Field of Search ...................................... 395/306, 308, 395/280, 284, 285, 200.43, 200.44; 711/100, 130, 131, 147, 148, 150, 153, 154; 345/508

[56] References Cited

U.S. PATENT DOCUMENTS

| | | | |
|---|---|---|---|
| 5,182,801 | 1/1993 | Asfour | 395/200.44 |
| 5,202,973 | 4/1993 | Ramanajan et al. | 711/147 |
| 5,214,775 | 5/1993 | Yabushita et al. | 711/117 |
| 5,265,218 | 11/1993 | Testa et al. | 395/280 |
| 5,299,309 | 3/1994 | Kuo et al. | 345/512 |
| 5,335,322 | 8/1994 | Mattison | 345/511 |
| 5,375,215 | 12/1994 | Hanawa et al. | 711/169 |
| 5,454,107 | 9/1995 | Lehman et al. | 711/153 |
| 5,469,558 | 11/1995 | Lieberman et al. | 395/285 |
| 5,513,331 | 4/1996 | Pawlowski et al. | 711/1 |
| 5,659,715 | 8/1997 | Wu et al. | 711/170 |
| 5,664,152 | 9/1997 | Ezzet | 711/153 |
| 5,673,388 | 9/1997 | Murthi et al. | 395/183.18 |
| 5,682,522 | 10/1997 | Huang et al. | 345/512 |

Primary Examiner—Tuan V. Thai
Attorney, Agent, or Firm—Fenwick & West LLP

[57] ABSTRACT

A computer system having a processor and at least one peripheral has a programmable shared memory system and method that selectively dedicates a first potion of memory to use by the processor and allocates a second portion of memory to shared use by the processor and any peripherals in the system. The programmable memory architecture is implemented using a dual bus architecture having a first-bus connected to the processor and a second bus coupled to the processor by a system controller and to the peripherals by a peripheral controller. The programmable memory architecture additionally has a configuration controller coupled to each configurable memory bank in the system. Each configuration controller is additionally coupled to both the first and second buses. Under programmed control, the each configuration controller couples the associated memory to either the first or second bus, responsive to configuration information stored in the system controller. Memory coupled to the first bus operates as dedicated processor memory and memory coupled to the second bus operates as shared memory, accessible by the processor and any peripherals in the system.

11 Claims, 5 Drawing Sheets

APPARATUS AND METHOD FOR IMPLEMENTING A PROGRAMMABLE SHARED MEMORY WITH DUAL BUS ARCHITECTURE

BACKGROUND OF THE INVENTION

1. Field of the Invention

This invention relates generally to memory architectures in a computer system and more particularly to architectures for sharing memory among central processing units and peripherals.

2. Description of the Related Art

Figure 1A:
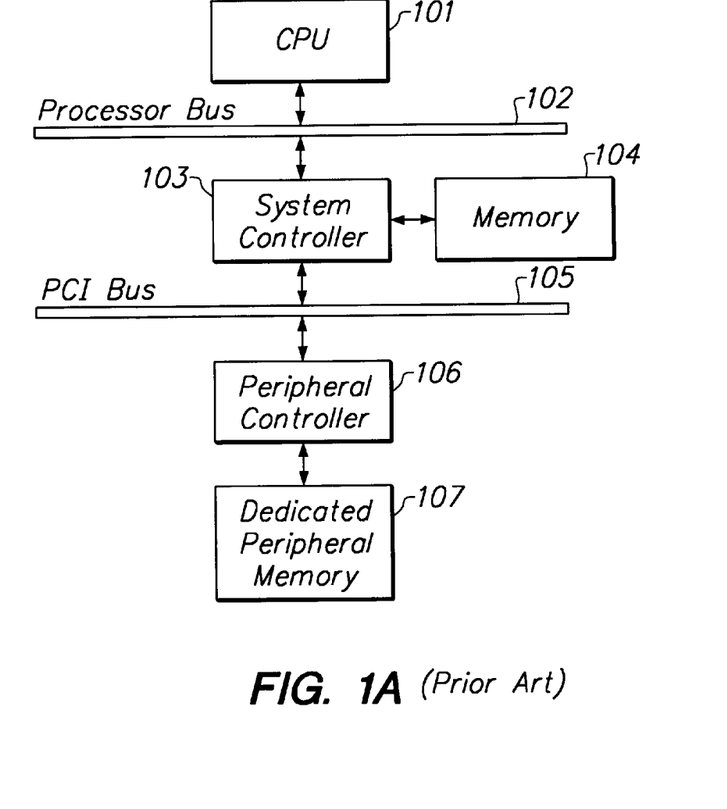
FIG. 1A illustrates a prior art fixed memory architecture.

Computer system performance and costs are affected by the system's memory architecture. Some conventional memory architectures have a fixed memory architecture wherein a certain amount of memory is dedicated to and coupled to a central processing unit (CPU) for exclusive use by the CPU while other memory is dedicated to and coupled to a peripheral such as a computer display. One typical configuration has several megabytes of dynamic random access memory (DRAM) dedicated to the CPU and separate DRAM dedicated for use by a peripheral such as a display device. FIG. 1A illustrates this conventional fixed memory architecture. Under the illustrated architecture, a CPU 101 is coupled to a memory 104 by processor bus 102 and system controller 103. Memory 104 is for example, a conventional DRAM bank dedicated for use by the CPU 101. In the illustrated architecture, system controller 103 is also coupled to a peripheral bus 105 such as a peripheral component interconnect (PCI) bus. Peripheral bus 105 couples CPU 101 to a conventional peripheral controller 106. Under this conventional architecture, peripheral controller 106 is coupled to dedicated peripheral memory 107. Thus, memory 104 is dedicated for use by CPU 101 and peripheral memory 107 is dedicated for use by an associated peripheral controller 106. In this architecture, the peripheral memory 107 (such as memory used as a frame buffer for graphics) dedicated to peripheral controller 106 can be quite large and is often times under-utilized if the peripheral associated with peripheral controller 106 does not require use of the entire memory space provided by memory 107. This under utilization of memory degrades system capability and increases the overall memory cost in a computer system.

Figure 1B:
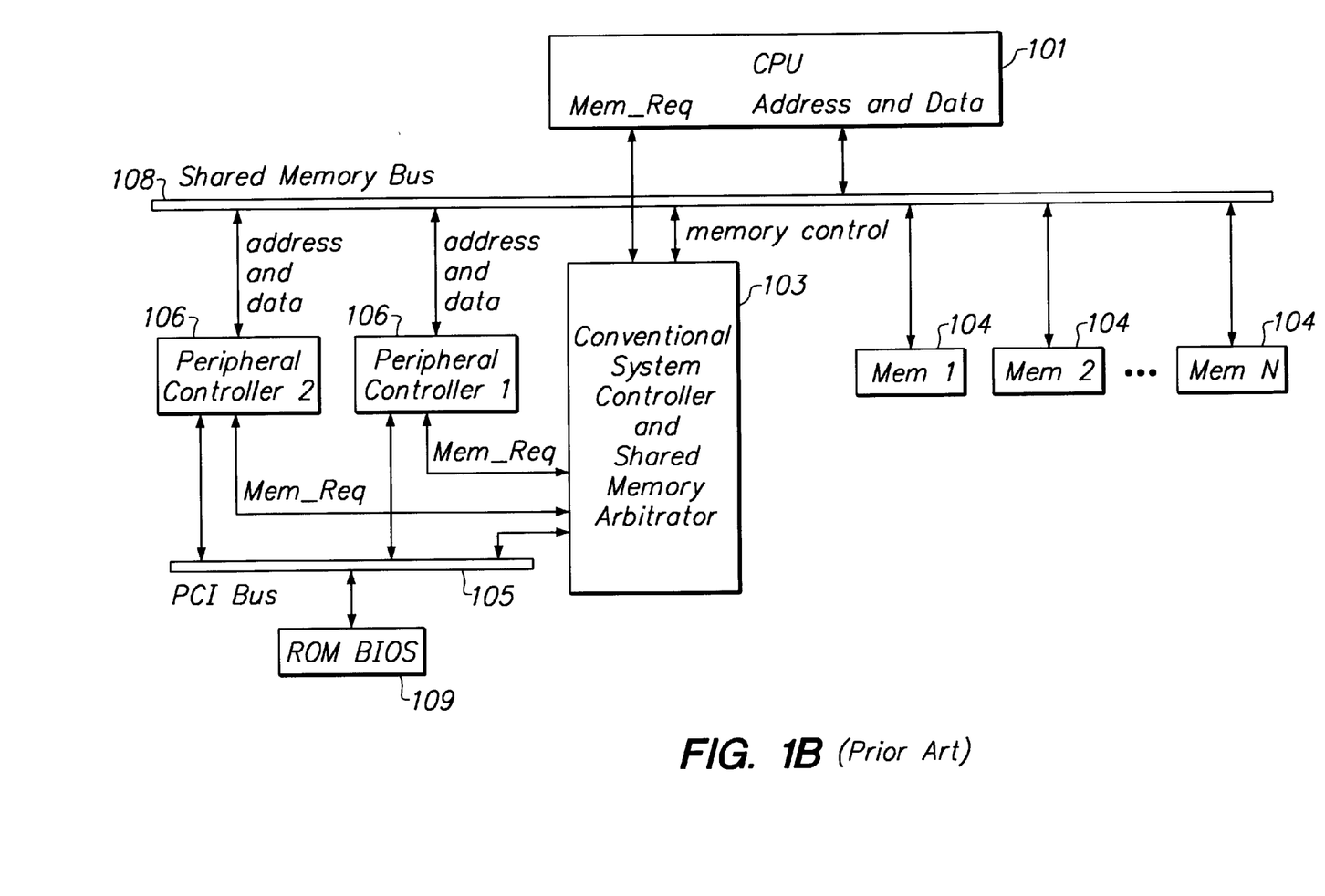
FIG. 1B illustrates a prior art unified memory architecture.

Another conventional memory architecture is a unified memory architecture (UMA). Systems having a unified memory architecture generally have decreased system costs and improved memory utilization. These benefits are realized by eliminating peripheral-dedicated memory. One conventional unified memory architecture is shown in FIG. 1B. The illustrated conventional unified memory architecture has a single shared memory bus 108 for coupling CPU 101 and peripheral controllers 106 to memory 104. The illustrated conventional unified memory architecture additionally has a system controller 103 coupled to memory request outputs of CPU 101 and peripheral controllers 106. System controller 103 arbitrates access of memory 104 by peripheral controllers 106 and CPU 101 to eliminate memory collisions. This memory access arbitration, however, can take several clock cycles and thus degrades system performance.

Thus, there is a need for a memory architecture that improves memory utilization, decreases overall system memory requirements and costs and does not degrade system performance.

SUMMARY OF THE INVENTION

In accordance with the present invention, there is provided a programmable shared memory system and method that improves memory utilization, decreases overall system memory requirements and costs and does not degrade system performance. The programmable shared memory system and method selectively dedicates a first portion of memory to use by a processor and allocates a second portion of memory to shared use by the processor and any peripherals in the system. The programmable memory architecture is implemented using a dual bus architecture and a plurality of configurable memory banks. The dual bus architecture has a first bus connected to the processor and a second bus coupled to the peripherals by peripheral controllers and also coupled to the processor by a system controller.

Also in accordance with the invention, the programmable memory architecture has a configuration controller coupled to each configurable memory bank. Each configuration controller is additionally coupled to both the first and second buses. Under programmed control, each configuration controller couples the associated memory to either the first or second bus, responsive to configuration information stored in the system controller. Memory coupled to the first bus (the processor bus) operates as dedicated processor memory and memory coupled to the second bus (the shared memory bus) operates as shared memory, accessible by the processor and any peripherals in the system.

Further in accordance with the invention, the system controller stores a memory configuration control word and arbitrates access of the shared memory to avoid collision on the shared memory bus. Because memory coupled to the processor bus is accessed by only the processor and not by any peripherals, the processor can perform peripheral independent processing simultaneous with peripheral access of the shared memory.

In another aspect of the invention, the programmable shared memory system and method dynamically configures the memory during system start-up in response to a received memory configuration request. Thus, responsive to the memory configuration request, a selected amount of system memory is configured as dedicated processor memory and a selected amount of memory is configured as shared memory (accessible by both the host processor and any system peripherals). Under this programmable architecture, the host processor is provided a dedicated memory space in addition to a memory space shared with system peripherals (a shared memory space).

Preferably, the memory allocation as between processor-dedicated memory (memory coupled to the processor bus) and shared memory (memory coupled to the shared memory bus) is user-selected on system start-up to achieve efficient system operation given the number of and types of peripheral devices in the system and the amount of physical memory included in the system.

In one embodiment, the memory configuration controller includes a data multiplexer, an address multiplexer and a control multiplexer for selectively coupling data, address and control signals associated with each memory to either the processor bus or to the shared memory bus.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF THE PREFERRED EMBODIMENT

Figure 2:
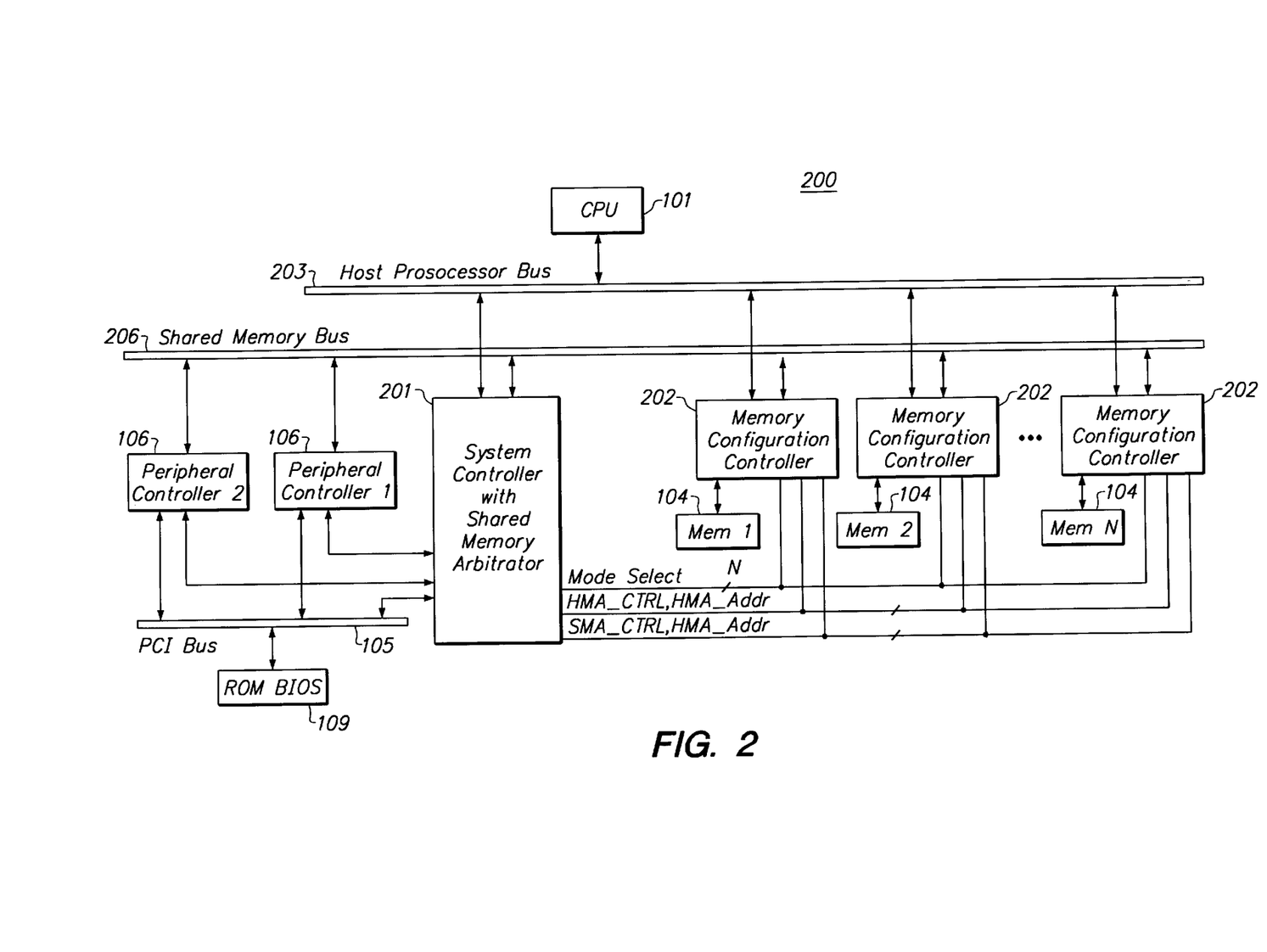
FIG. 2 is a functional block diagram of a computer system having a programmable shared memory architecture in accordance with the present invention.

FIG. 2 illustrates a computer system 200 having a programmable shared memory architecture in accordance with the present invention. Computer system 200 includes a host central processing unit (CPU) 101, a system controller 201, a plurality of memory configuration controllers 202 each coupled to an associated memory (or memory bank) 104, conventional peripheral controllers 106 and a basic input/output system stored in a read only memory (a ROM BIOS) 109. System 200 has a dual bus architecture including a host processor bus (HPB) 203 and a shared memory bus (SMB) 206. Host processor bus 203 couples CPU 101 to the system controller 201 and to each memory configuration controller 202. Shared memory bus 206 is coupled to peripheral controller 106, to the system controller 201 and to each memory configuration controller 202. System 200 additionally preferably includes a PCI bus 205 coupled to each peripheral controller 106 and to the ROM BIOS 109. In the preferred embodiment, there are six banks of memory 104 (thus N=6 in FIGS. 2 and 4). The principles of the present invention apply, however, to systems having a different number of memories 104.

In a preferred embodiment, CPU 101 is a Pentium® microprocessor manufactured by Intel Corporation. Other processors such as the '486 microprocessor manufactured by Intel Corporation, the K5 processor manufactured by Advanced Micro Devices, Inc. or the M1 processor manufactured by Cyrix Corporation may alternatively be used. Also in the preferred embodiment, memory 104 is a dynamic random access memory (DRAM) manufactured by NEC Electronics.

System controller 201 (described in reference to FIG. 4 below) is preferably a customized application specific integrated circuit having circuit modules for performing system control functions including: (i) providing a bridge interface to PCI bus 105; (ii) storing system configuration information including memory configuration information; (iii) decoding addresses; (iv) controlling cache memory (not shown); (v) providing an interface to each memory 104; and (vi) arbitrating memory access.

Peripheral controller 106 is a conventional peripheral device controller and couples to an associated peripheral. ROM BIOS 109 is a conventional read only memory (ROM) device programmed to store a BIOS program in accordance with the present invention. In the illustrated embodiment, HPB 203 and SMB 206 are busses having 64 bit wide data paths. It should be understood, however, that the principles of the present invention apply to systems having other bus widths, other memory types, other memory sizes and other controller configurations.

In accordance with the present invention, each of the memories 104 (collectively referred to as "system memory") are configured to operate as either dedicated host processor memory or as shared memory to be accessed by either a peripheral device (through peripheral controller 106) or the host processor (CPU 101). In one embodiment, the memories 104 are configured during the boot-up (system start-up) process. In other embodiments, the memories are configured during a higher level system or operating system configuration process. For example, in one embodiment with an operating system that provides a window-based user interface, memory set-up occurs during the configuration of the window properties. The specific memory configuration is specified by a user or is programmed based on system parameters such as the total amount of system memory, the types of peripherals coupled to the system 200 and the type of task or tasks to be performed by the system and their corresponding demand on memory. Thus, under programmed control, memory is dynamically allocated as either host processor memory or shared memory. This flexibility in system memory configuration allows for the selecting of the size of each memory space (host processor memory and shared memory) to improve memory utilization given the current peripheral configuration and the type of tasks to be performed. Thus, the programmable memory architecture advantageously provides efficient memory utilization and thus decreases overall system cost without degrading system performance.

Referring now again to FIG. 2, CPU 101 configures each memory 104 using system controller 201 and memory configuration controllers 202. On boot-up, a BIOS program is uploaded from the ROM BIOS 109 to local memory on CPU 101. Preferably, the BIOS program performs memory tests, determines the total system memory available in computer system 200 and reports memory availability to a user on a computer display (not shown). Alternatively, memory is configured during a higher level configuration process such as during operating system configuration. In a preferred embodiment, a user is prompted to specify a desired memory allocation as between the amount of memory to dedicate to CPU 101 and the amount to allocate as shared memory, to be shared by CPU 101 and peripheral controller 106. The memory configuration information is written to and stored in system controller 201. System controller 201 is coupled to each memory configuration controller 202 to configure each memory 104 to operate as either dedicated host processor memory or shared memory as selectively programmed by the user.

Memory configuration controller 202 has a first input and output (I/O) port coupled to the processor bus, a second I/O port coupled to the shared memory bus and a third I/O port coupled to an associated memory 104. Each memory configuration controller 202 receives a mode select control signal from system controller 201. The mode select signal indicates the particular allocation (shared or dedicated host processor) associated with each memory 104. Responsive to the received mode select signal being in either a first or second digital state, memory configuration controller 202 couples the memory I/O port to either the SMB 206 or to the HPB 203 respectively. In addition to being coupled to a mode select control signal, memory configuration controllers 202 are also coupled to the host memory control outputs of system controller 201 to receive the HMA_CTRL control signal set and to the shared memory control outputs of system controller 201 to receive the SMA_CTRL signal set. The mode select, SMA_CTRL and HMA_CTRL signals are generated by system controller 201 and are used by memory configuration controller 202 to generate read, write and enable control signals for each associated memory 104.

Figure 3:
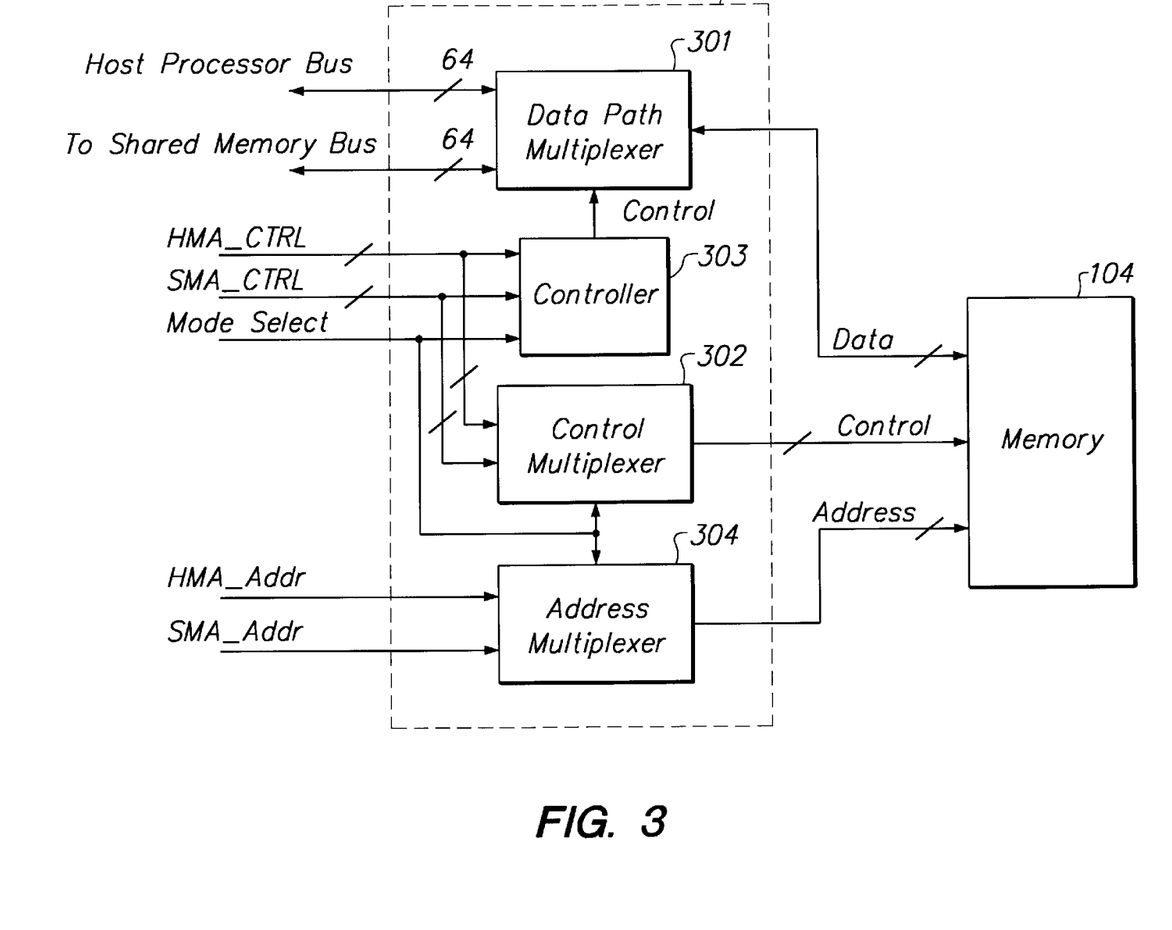
FIG. 3 is functional block diagram of a memory configuration controller in accordance with the present invention.

Referring now to FIG. 3, there is shown a functional block diagram of a memory configuration controller 202 in accordance with the present invention. Memory configuration controller 202 has a data router 301, a control multiplexer 302, an address multiplexer 304 and a controller 303.

Data router 301 is a multiplexer/selector having first and second I/O ports for selectively coupling to a third I/O port responsive to control signals received from controller 303. The first I/O port is coupled to the HPB 203 and the second I/O port is coupled to SMB 206. Thus, data router 301 couples the data bus associated with memory 104 (and thus memory 104) to either HPB 203 or to SMB 206 in response to the control signals generated by controller 303.

Controller 303 is coupled to system controller 201 and receives the HMA_CTRL, SMA_CTRL and mode select control signals from the system controller 201. Controller 303 decodes the received control signals to generate a set of control signals to control the operation of data router 301. Specifically, controller 303 generates an output enable (OE) signal and a bus select (SEL) signal. Responsive to the output enable and bus select signals having the following states (as shown in Table 1), the data router is placed in the following modes of operation (also shown in Table 1).

TABLE 1

| OE | SEL | Mode of Operation |
|----|-----|-------------------|
| 0 | 0 | memory not coupled to either bus |
| 0 | 1 | memory not coupled to either bus |
| 1 | 0 | memory coupled to SMB |
| 1 | 1 | memory coupled to HPB |

Controller 303 decodes the HMA_CTRL, SMA_CTRL and mode select control signals to generate the output enable (OE) and bus select (SEL) control signals shown in Table 1. The HMA_CTRL control signals are a set of control signals including a read enable (RD) and a write enable (WR) signal. The SMA_CTRL control signals also include a read enable (RD) and a write enable (WR) signal. The HMA_CTRL and SMA_CTRL control signal sets are determined by the control signals needed to operate memory 104. Other memory types have different control requirements and thus require different control signal sets and different decoding by controller 303. Table 2 illustrates the state of output signals OE and SEL that are generated by controller 303, responsive to the HMA_CTRL, SMA_CTRL and mode select control signals generated by system controller 201.

TABLE 2

| Mode Select | HMA_CTRL | | SMA_CTRL | | | |
|---|---|---|---|---|---|---|
| | RD | WR | RD | WR | OE | SEL |
| 0 | * | * | 0 | 0 | 0 | * |
| 0 | * | * | 0 | 1 | 1 | 0 |
| 0 | * | * | 1 | 0 | 1 | 0 |
| 1 | 0 | 0 | * | * | 0 | * |
| 1 | 0 | 1 | * | * | 1 | 1 |
| 1 | 1 | 0 | * | * | 1 | 1 |

The mode select signal has a first state (a digital "0" or low state) where the SMB 206 is selected and has a second state (a digital "1" or a high state) where the HPB 203 is selected. When the SMA 206 bus is selected (mode select=0), the HMA_CTRL control signals are not used to generate the OE and SEL signals and thus the HMA_CTRL control signals are shown as don't care (*) states in Table 2. Similarly, when the HPB 203 is selected (mode select=1), the SMA_CTRL control signals are not used to generate the OE and SEL signals and thus the SMA_CTRL control signals are shown as don't care (*) states in Table 2.

Control multiplexer 302 is a multiplexer/selector having first and second I/O ports for selectively coupling to a third I/O port responsive to a mode select control signal. The first I/O port is coupled to the HMA_CTRL control signals (received from system controller 201) and the second I/O port is coupled to the SMA_CTRL control signals (also received from system controller 201). Thus, control multiplexer 302 couples the control inputs associated with memory 104 to either the HMA_CTRL or the SMA_CTRL control signals, in response to the mode select signal being in either a first or second state, for example a digital "1" or a digital "0".

Similarly, address multiplexer 304 is a multiplexer/selector having first and second I/O ports, that are selectively configured to couple to a third I/O port in response to a control signal. The first I/O port is coupled to the HMA_Addr signals generated by system controller 201, the second I/O port is coupled to the SMA_Addr signals also generated by system controller 201 and the third I/O port is coupled to the address inputs of memory 104. Thus, address multiplexer 304 couples the address inputs associated with memory 104 to either the HMA_Addr address signals or to the SMA_Addr address signals responsive to the state of the mode select signal generated by system controller 201.

Figure 4:
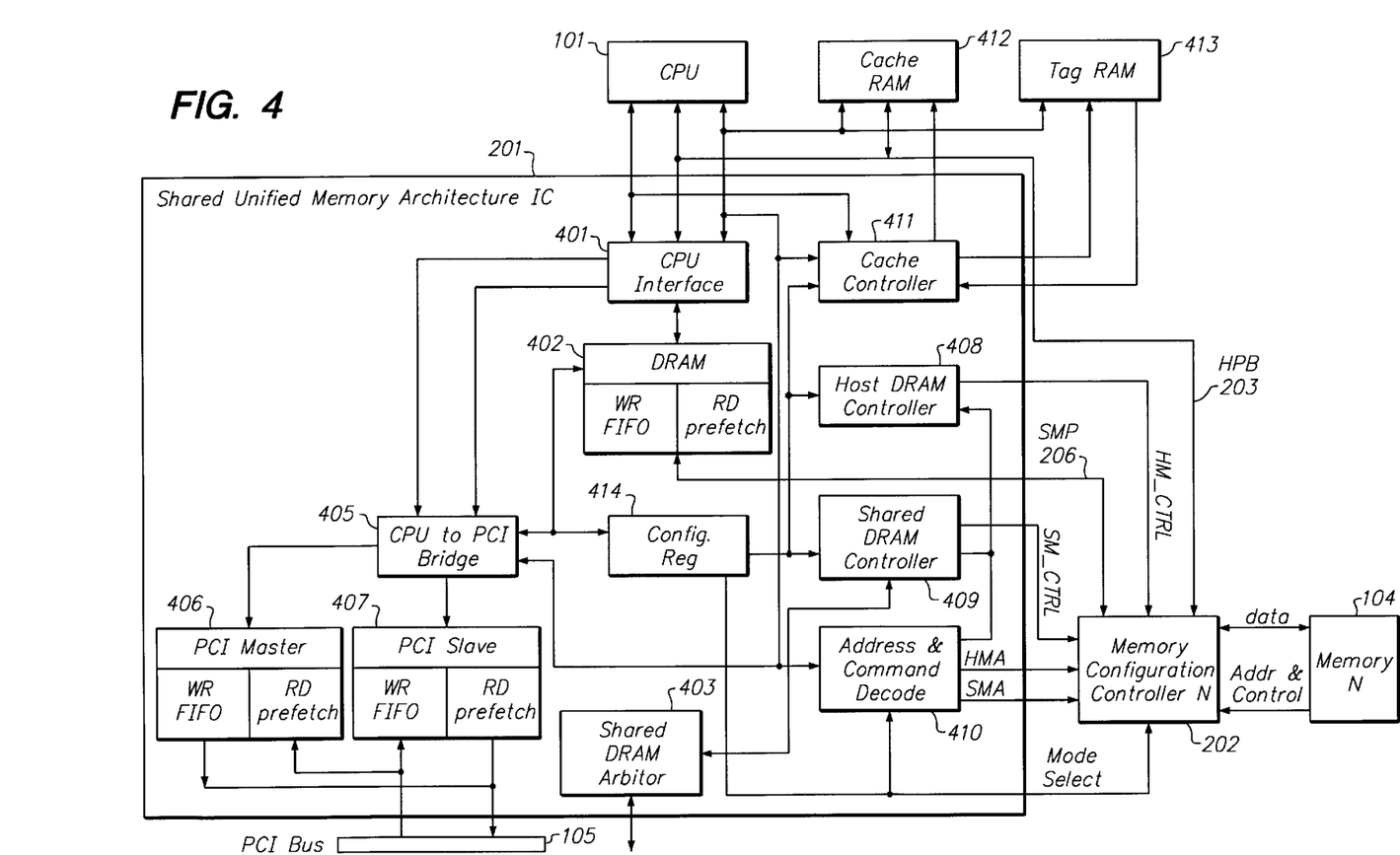
FIG. 4 is a functional block diagram of a system controller in accordance with the present invention.

FIG. 4 illustrates a system controller 201 in accordance with the present invention. System controller 201 includes a CPU interface 401 adapted to couple to CPU 101 and further adapted to provide an interface between system controller 201 and CPU 102. System controller 201 also includes a DRAM buffer 402 coupled to the CPU interface 401 for read and write buffering of information received from or being written to either a peripheral controller 106 or memory 104. DRAM buffer 402 is coupled to the PCI bus 105 via bridge 405 and buffers 406, 407 to enable buffering of information being written to or read from a peripheral. DRAM buffer 402 is additionally coupled to SMB 206 to enable buffering of information being written to or read from memory 104 that has been configured as shared memory.

Figure 5:
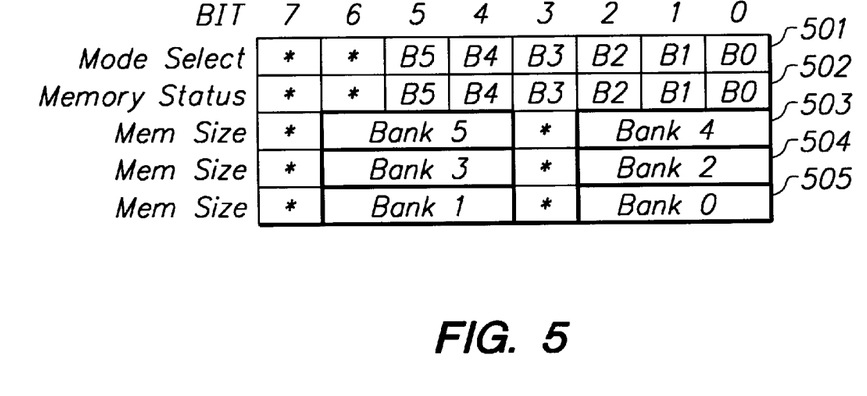
FIG. 5 illustrates an array of registers included in the system controller in accordance with the present invention.

System controller 201 also includes a configuration register 414 coupled to the CPU 101 by bridge 405 and the CPU interface 401. Configuration register 414 receives and stores system configuration information including cache information, PCI interface information and memory configuration data. In the preferred embodiment, configuration register 414 is an array of 8 bit wide registers. FIG. 5 illustrates an array of registers that relate to memory configuration and that are included in configuration register 414 in accordance with the present invention.

Register 501 is a mode select register for storing the status of the selected mode (shared or host) for each memory 104. Bits 0–5 of register 501 each correspond to a memory 104. Table 3 shows the decoding of register 501.

TABLE 3

| Bit | Default | Function |
|-----|---------|----------|
| 7:6 | 0h | Reserved. |
| 5 | 0 | 1: Bank 5 is on the host bus. |
| | | 0: Bank 5 is on the shared memory bus. |

TABLE 3-continued

| Bit | Default | Function |
|---|---|---|
| 4 | 0 | 1: Bank 4 is on the host bus. |
|   |   | 0: Bank 4 is on the shared memory bus. |
| 3 | 0 | 1: Bank 3 is on the host bus. |
|   |   | 0: Bank 3 is on the shared memory bus. |
| 2 | 0 | 1: Bank 2 is on the host bus. |
|   |   | 0: Bank 1 is on the shared memory bus. |
| 1 | 0 | 1: Bank 1 is on the host bus. |
|   |   | 0: Bank 1 is on the shared memory bus. |
| 0 | 0 | 1: Bank 0 is on the host bus. |
|   |   | 0: Bank 0 is on the shared memory bus. |

A bit having a first state (a digital "0" or a low state) indicates that shared mode is selected for the corresponding memory 104. A bit having a second state (a digital "1" or a high state) indicates that host mode is selected for the corresponding memory 104. Bits 6 and 7 of register 501 are not used in the system. Output bits 0–5 of register 501 each form a static mode select signal that is coupled to each memory configuration controller 202.

Register 502 is a memory status register for storing the stating (whether memory is present and enabled) of system memory. The decoding of register 502 is shown in Table 4.

TABLE 4

| Bit | Default | Function |
|---|---|---|
| 7:6 | 0h | Reserved. |
| 5 | 0 | Bank 5 |
|   |   | 1: Enabled and Present |
|   |   | 0: Disabled or not Present |
| 4 | 0 | Bank 4 |
|   |   | 1: Enabled and Present |
|   |   | 0: Disabled or not Present |
| 3 | 0 | Bank 3 |
|   |   | 1: Enabled and Present |
|   |   | 0: Disabled or not Present |
| 2 | 0 | Bank 2 |
|   |   | 1: Enabled and Present |
|   |   | 0: Disabled or not Present |
| 1 | 0 | Bank 1 |
|   |   | 1: Enabled and Present |
|   |   | 0: Disabled or not Present |
| 0 | 0 | Bank 0 |
|   |   | 1: Enabled and Present |
|   |   | 0: Disabled or not Present |

In the preferred embodiment, bits 0–5 each correspond to a bank of memory (such as memory 104) which may be used in the system. A bit having a first state indicates that the corresponding bank of memory 104 is present and enabled and a bit having a second state indicates that the corresponding bank of memory 104 is either not present or not enabled.

Registers 503–505 store information indicating the size of each memory 104. The decoding of registers 503–505 are shown in Tables 5, 6 and 7.

TABLE 5

Register 503

| Bit | Default | Function |
|---|---|---|
| 7 | 0 | Reserved. |
| 6:4 | 0h | Bank 5 SDRAM Size |
|   |   | 000: 1Mx16 SDRAM |
|   |   | 001: 2Mx8 SDRAM |
|   |   | 010: 4Mx4 SDRAM |
|   |   | others: reserved |

TABLE 5-continued

Register 503

| Bit | Default | Function |
|---|---|---|
| 3 | 0 | Reserved. |
| 2:0 | 0h | Bank 4 SDRAM Size |
|   |   | 000: 1Mx16 SDRAM |
|   |   | 001: 2Mx8 SDRAM |
|   |   | 010: 4Mx4 SDRAM |
|   |   | others: reserved |

TABLE 6

Register 504

| Bit | Default | Function |
|---|---|---|
| 7 | 0 | Reserved. |
| 6:4 | 0h | Bank 3 SDRAM Size |
|   |   | 000: 1Mx16 SDRAM |
|   |   | 001: 2Mx8 SDRAM |
|   |   | 010: 4Mx4 SDRAM |
|   |   | others: reserved |
| 3 | 0 | Reserved. |
| 2:0 | 0h | Bank 2 SDRAM Size |
|   |   | 000: 1Mx16 SDRAM |
|   |   | 001: 2Mx8 SDRAM |
|   |   | 010: 4Mx4 SDRAM |
|   |   | others: reserved |

TABLE 7

Register 505

| Bit | Default | Function |
|---|---|---|
| 7 | 0 | Reserved. |
| 6:4 | 0h | Bank 1 SDRAM Size |
|   |   | 000: 1Mx16 SDRAM |
|   |   | 001: 2Mx8 SDRAM |
|   |   | 010: 4Mx4 SDRAM |
|   |   | others: reserved |
| 3 | 0 | Reserved. |
| 2:0 | 0h | Bank 0 SDRAM Size |
|   |   | 000: 1Mx16 SDRAM |
|   |   | 001: 2Mx8 SDRAM |
|   |   | 010: 4Mx4 SDRAM |
|   |   | others: reserved |

Configuration register 414 is also coupled to cache controller 411, to a host DRAM controller 408, to a shared DRAM controller 409 and to address and command decoder 410.

The host and shared DRAM controllers, 408 and 409 respectively are coupled to the configuration register 414 and to the address and command decoder 410 to receive configuration control and decoded address information. Host and shared DRAM controller 408 and 409 each manage DRAM functions by generating the appropriate read, write and refresh signals for the associated memory 104.

The shared memory DRAM controller 409 is coupled to each memory configuration controller 202 and generates control signals for configuring each memory configuration controller 202 to couple associated memory 104 to the shared memory bus 206. Shared DRAM controller 409 additionally generates read and write control signals responsive to the type of memory access (read or write) requested by either CPU 101 or by a peripheral controller 106.

The host DRAM controller 408 is coupled to each memory configuration controller 202 and generates control signals for configuring each memory configuration controller 202 to couple the associated memory 104 to the host processor bus 203. Host DRAM controller 408 additionally generates read and write control signals responsive to the type of memory access (read or write) requested by CPU 101.

Address and command decoder 410 is coupled to bridge 405 and to configuration register 414. Address and command decoder 410 has a host memory decoder and a shared memory decoder. The host memory decoder decodes the address received from bridge 405 to determine whether the address corresponds to host processor memory or to shared memory. If, at the start of a new memory access cycle, address and command decoder 410 determines that the address corresponds to host memory, address and command decoder 410 generates a trigger control signal to activate host DRAM controller 408. If, at the start of a new memory cycle, address and command decoder 410 determines that the address corresponds to shared processor memory, address and command decoder 410 generates a trigger control signal to activate shared DRAM controller 409.

Address and command decoder 410 additionally generates HMA_CTRL and SMA_CTRL control signal sets, each coupled to each memory configuration controller 202.

System controller 201 additionally includes a PCI master interface 406 and a PCI slave interface 407. PCI master interface 406 is a conventional PCI bus interface adapted to interface with PCI bus masters. PCI master interface 406 preferably includes a read prefetch buffer and a write buffer. PCI slave interface 407 is a conventional PCI bus interface adapted to interface with PCI slave peripherals.

System controller 201 preferably also includes a cache controller 411 for controlling any RAM cache 412 with associated tag RAM 413 optionally included in the system.

System controller 201 also includes an arbitration unit 403. Arbitration unit 403 is coupled to shared DRAM controller 409 and to each peripheral controller 106. Arbitration unit 403 receives a memory request signal generated by each peripheral controller 106 when memory access is needed. Arbitration unit 403 determines which requesting bus master is granted access to the shared memory. After selecting a bus master for access grant, arbitration unit 403 sends a "GRANT" signal back to the corresponding peripheral controller 106.

Thus during operation, for example a first memory 104 may be configured to operate as dedicated host processor memory while the remaining memories 104 are configured to operate as shared memory. With this configuration, the CPU 101 accesses the first memory 104 without requiring arbitration, as no memory collision can occur with dedicated host processor memory. Simultaneous to CPU 101 accessing first memory 104, peripherals can access any of the shared memory 104. Thus, while CPU 101 is performing peripheral independent operations, and thus is accessing only dedicated host memory, peripherals having bus master capability can independently access shared memory.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method of allocating a memory having a first portion and a second portion each of said first and second portions alternatively connectable to one from the group of a processor bus and a peripheral bus in a computer system having a processor and a peripheral, the method comprising the steps of:

receiving a memory configuration request by a system controller;

dedicating a first portion of the memory to the processor using a first memory configuration controller, the first memory configuration controller coupled to the system controller, to the processor bus, to the peripheral bus and the memory for selectively coupling the memory to one of the peripheral bus and the processor bus responsive to a stored memory configuration, the first memory configuration controller having a data multiplexer having a first port coupled to the peripheral bus and a second port coupled to the processor bus and a third port coupled to a memory data path for selectively coupling the third port to one of the first and second ports responsive to control signals received from the system controller, the first portion of the memory being determined from the configuration request; and allocating a second portion of the memory to shared use by the processor and the peripheral using a second memory configuration controller, the second portion being determined from the configuration request, the second memory configuration controller coupled to the system controller, to the processor bus, to the peripheral bus and the second portion of memory for selectively coupling the memory to one of the peripheral bus and the processor bus responsive to a stored memory configuration, the second memory configuration controller having a second data multiplexer having a first port coupled to the peripheral bus and a second port coupled to the processor bus and a third port coupled to a memory data path for selectively coupling the third port to one of the first and second ports responsive to control signals received from the system controller.

2. The method of claim 1 wherein the step of dedicating a first portion of the memory to the processor comprises connecting the first portion of the memory to the processor bus and wherein allocating a second portion of the memory to shared use by the processor and the peripheral comprises connecting the second portion of the memory to the peripheral bus coupled to both the processor and to the peripheral.

3. The method of claim 2 wherein connecting the first portion of the memory to a processor bus comprises coupling address inputs, data ports and control inputs of the first memory portion to the processor bus using a first switching circuit and wherein connecting the second portion of the memory to a peripheral bus coupled to both the processor and to the peripheral comprises coupling address inputs, data ports and control inputs to the peripheral bus using a second switching circuit.

4. The method of claim 1 further comprising arbitrating access to the second portion of the memory.

5. The method of claim 1 further comprising arbitrating access to the second portion of the memory and allowing unarbitrated access to the first portion of the memory.

6. The method of claim 1 wherein receiving a configuration request comprises:

determining the amount of available system memory;

displaying an indication of the determined amount of available system memory to a user; and after displaying the indication of available system memory, receiving a configuration request.

7. The method of claim 1 wherein receiving a configuration request comprises:

storing a set of predetermined configuration, requests, each corresponding to an amount of available system memory;

determining the amount of available system memory; and retrieving a predetermined configuration request corresponding to the determined amount of available system memory.

8. In a system having a processor, a peripheral and a memory, an apparatus for configuring the memory as shared memory for access by the processor and by the peripheral or as dedicated memory for access by the processor, the apparatus comprising:

a first bus connected to the processor;

a second bus coupled to the peripheral;

a system controller coupled to the second bus, to the first bus and to the memory for providing control and address signals to the memory and for configuring the memory as either shared memory or dedicated memory and having a configuration register for storing a memory configuration; and a memory configuration controller coupled to the system controller, to the second bus, to the first bus and the memory for selectively coupling the memory to one of the first bus and the second bus responsive to the stored memory configuration, the memory configuration controller having a data multiplexer having a first port coupled to the first bus and a second port coupled to the second bus and a third port coupled to a memory data path for selectively coupling the third port to one of the first and second ports responsive to control signals received from the system controller.

9. The system of claim 8 wherein the memory configuration controller further comprises a control multiplexer having a select input coupled the system controller, a first input port coupled to a first control output of the system controller, a second input port coupled to a second control output of the system controller and a third output port coupled to a memory control input.

10. The system of claim 8 wherein the system controller further comprises an arbitrator operatively coupled to the processor and to the peripheral for arbitrating access of the second bus.

11. The system of claim 8 wherein the system includes a plurality of memories, and the apparatus includes a plurality of memory configuration controller, each of the plurality of memory configuration controllers coupled to the system controller, to the second bus, to the first bus and to a respective one of the plurality of memories for selectively coupling the memory to one of the first bus and the second bus responsive to the stored memory configuration.

* * * * *